Figure 8:
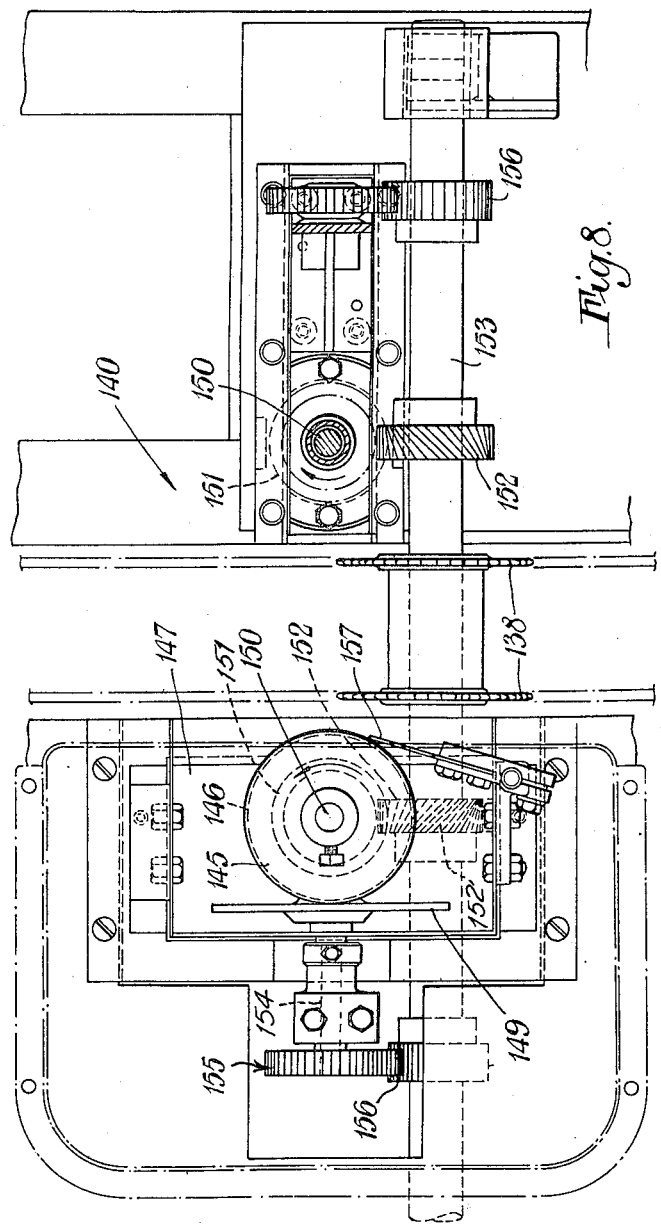

Feb. 2, 1954   J. E. BRANDENBERGER   2,667,723
METHOD AND APPARATUS FOR PRODUCING WRAPPED ARTICLES
Filed Nov. 26, 1952   7 Sheets-Sheet 1
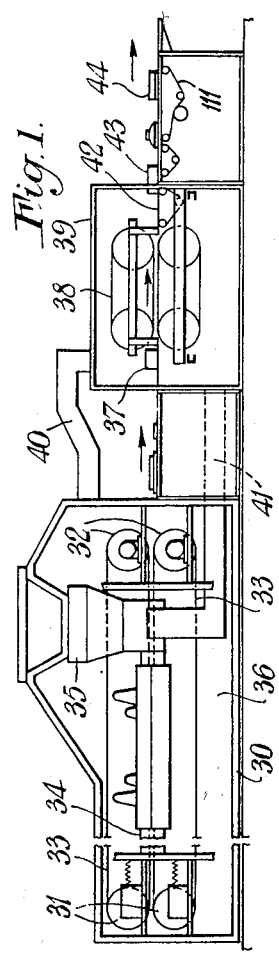
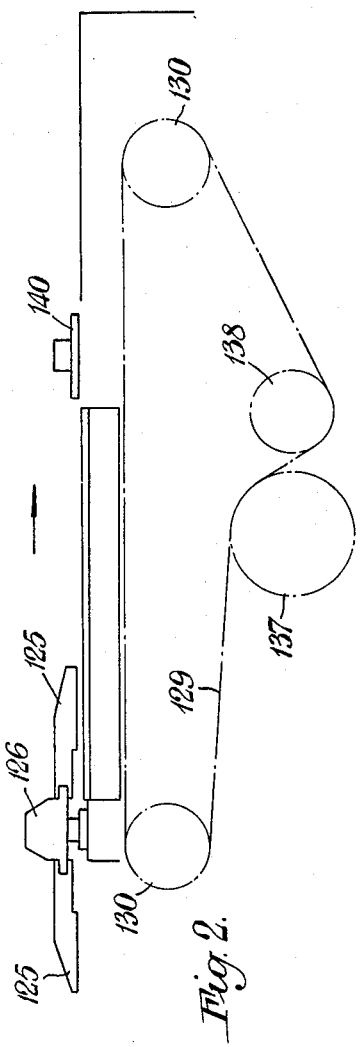
INVENTOR
JACQUES EDWIN BRANDENBERGER
BY
ATTORNEY

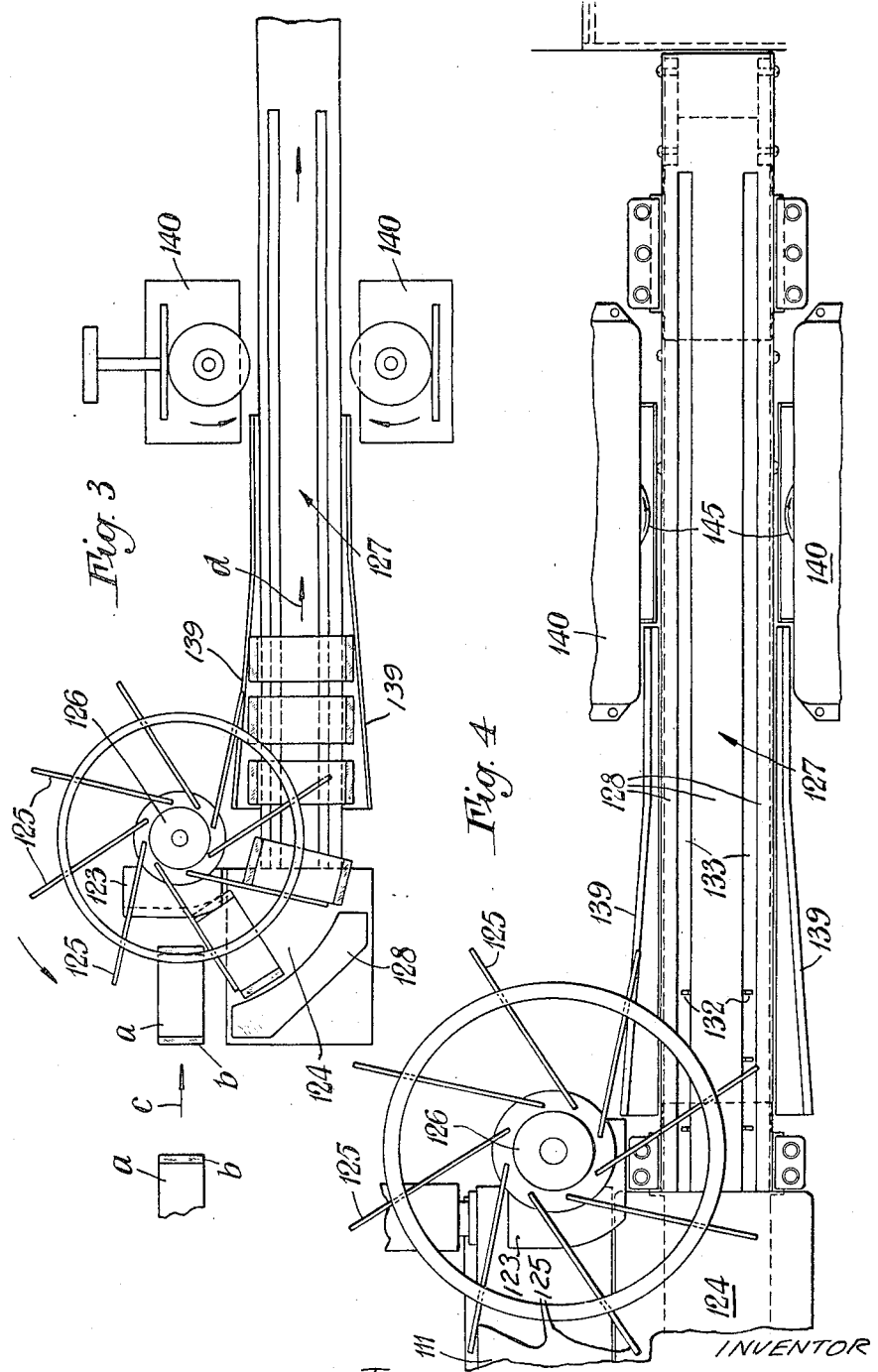

Feb. 2, 1954   J. E. BRANDENBERGER   2,667,723
METHOD AND APPARATUS FOR PRODUCING WRAPPED ARTICLES
Filed Nov. 26, 1952   7 Sheets-Sheet 3
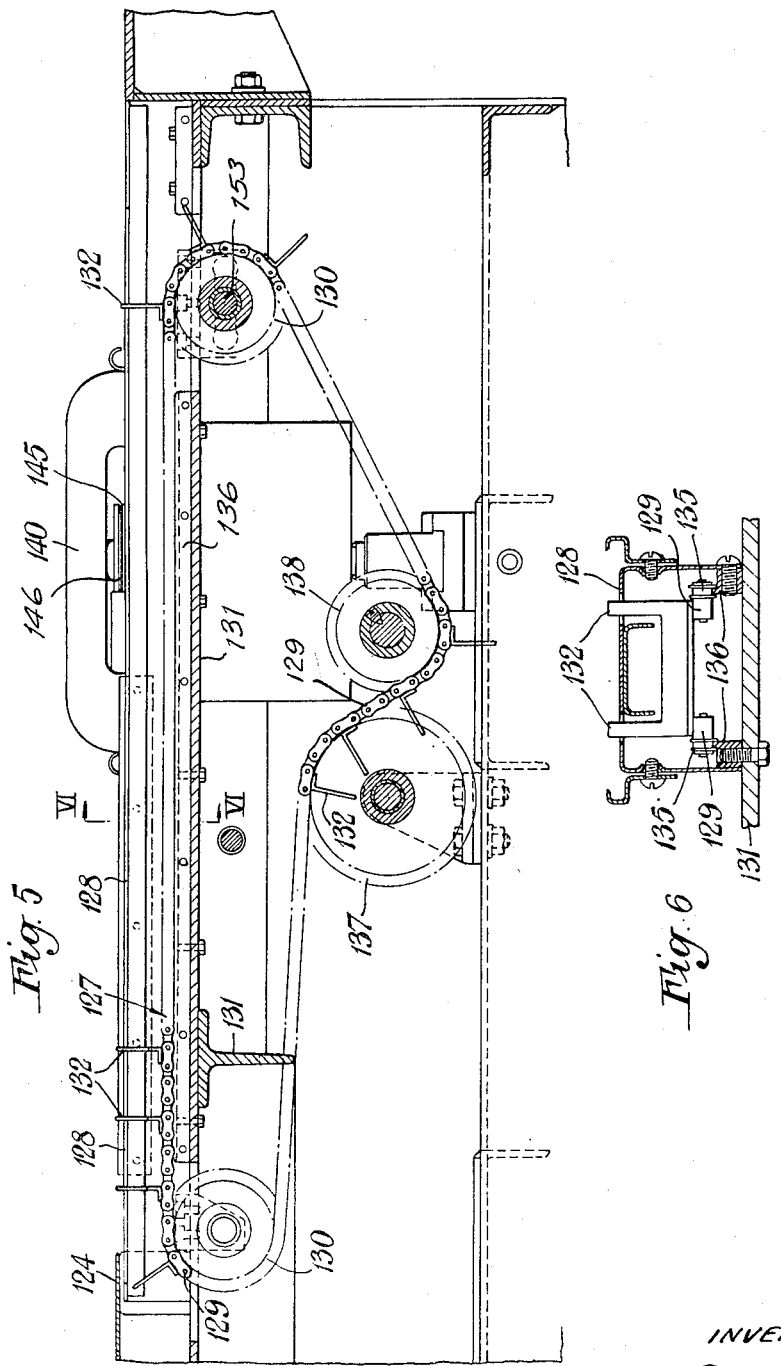
INVENTOR
JACQUES EDWIN BRANDENBERGER
BY
ATTORNEY

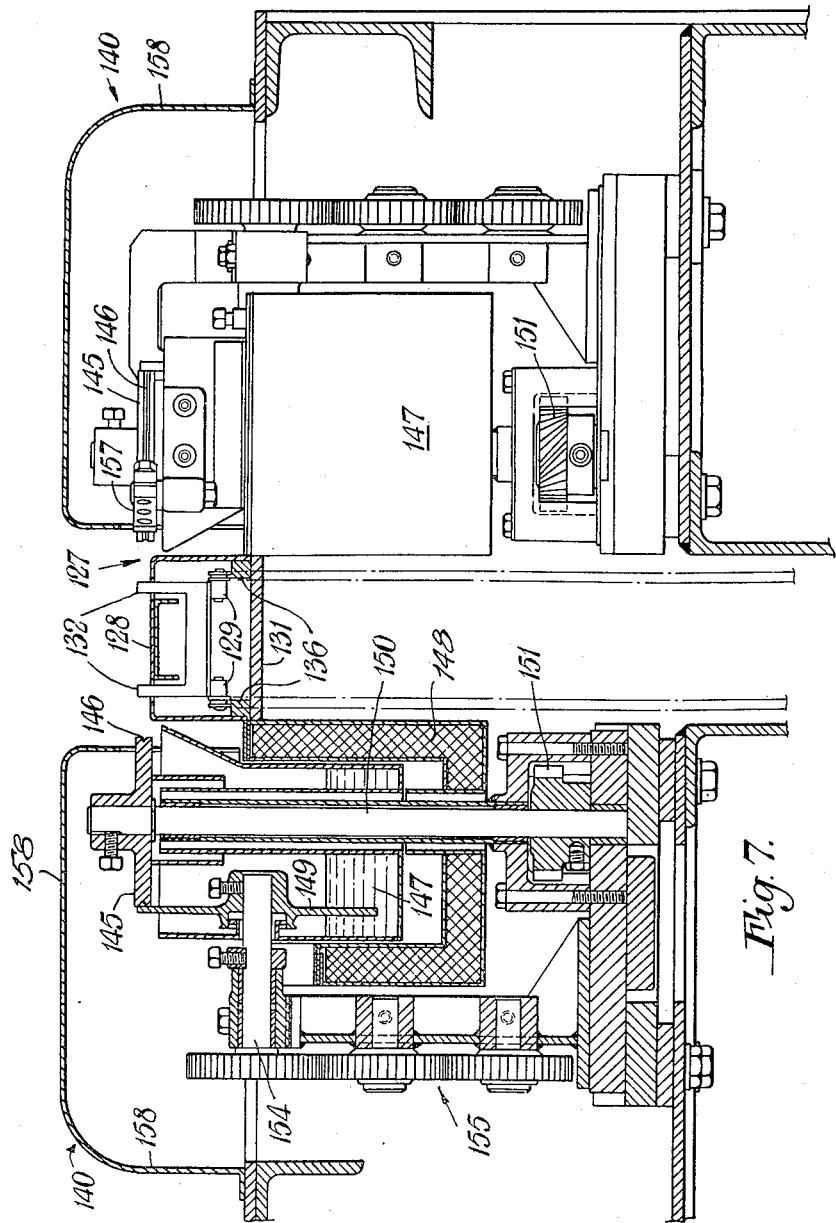

Feb. 2, 1954  J. E. BRANDENBERGER  2,667,723
METHOD AND APPARATUS FOR PRODUCING WRAPPED ARTICLES
Filed Nov. 26, 1952  7 Sheets-Sheet 5

INVENTOR
JACQUES EDWIN BRANDENBERGER
BY
ATTORNEY

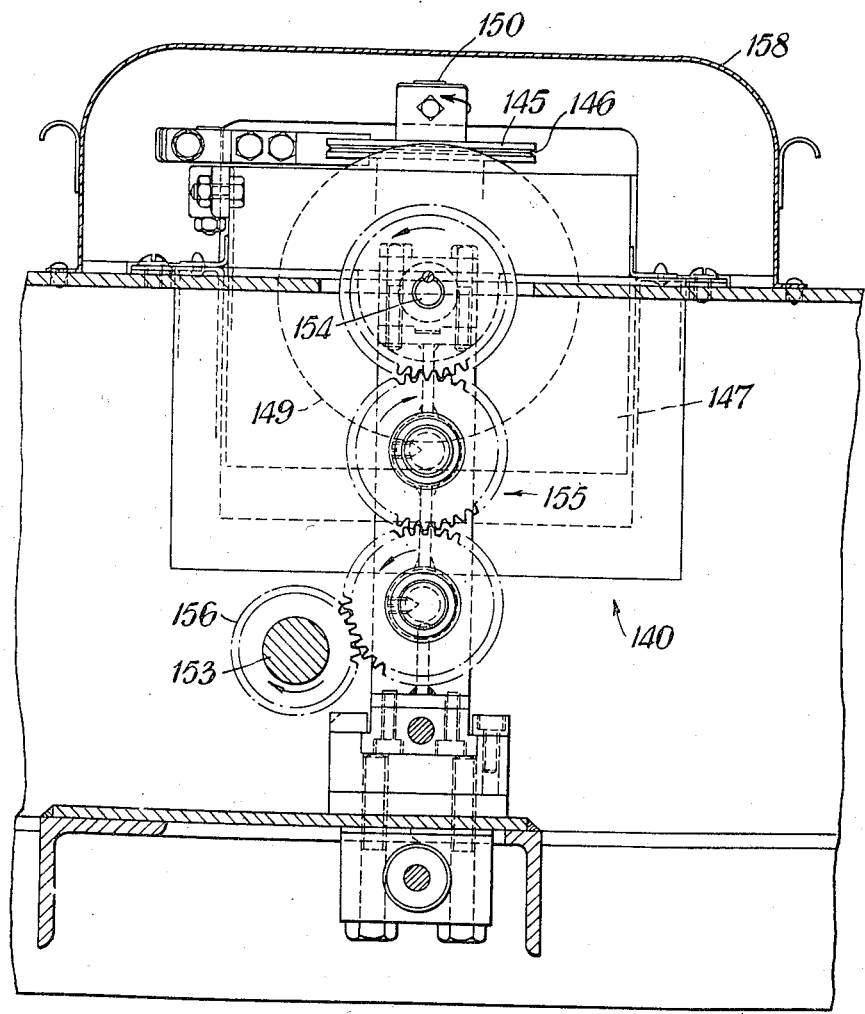

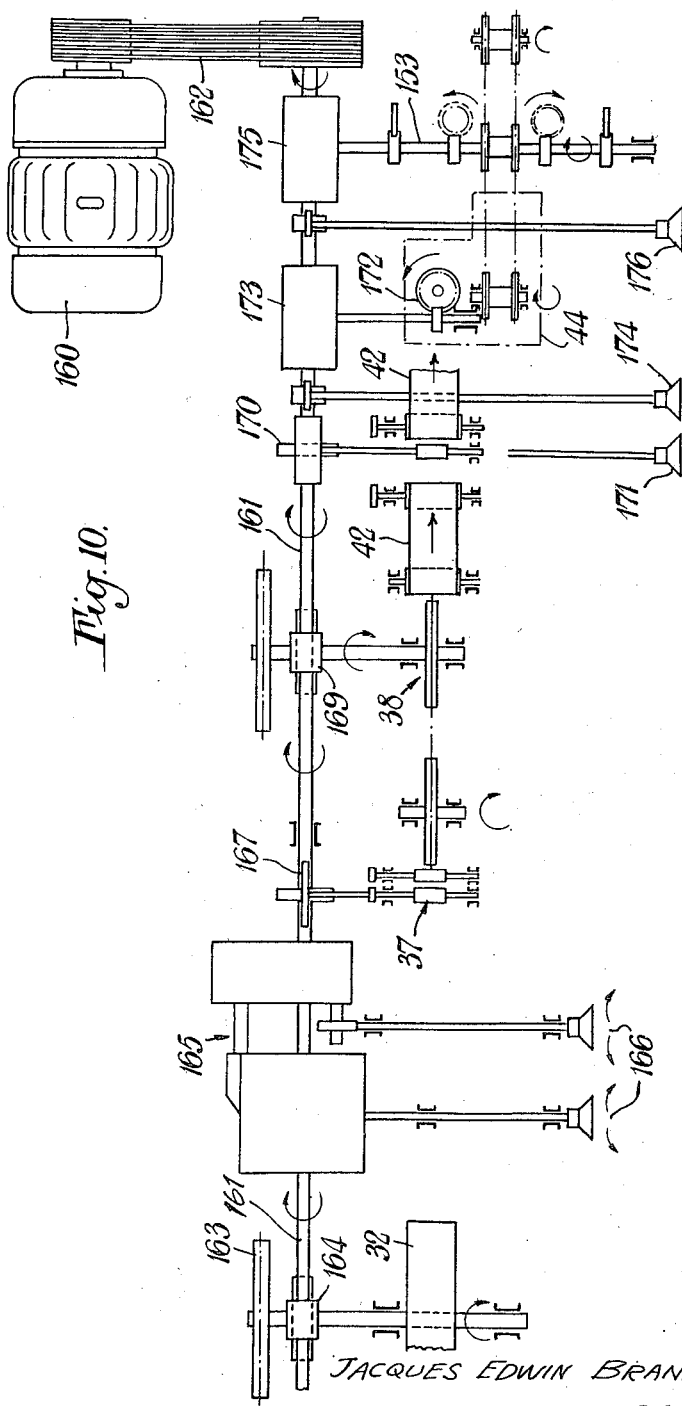

Patented Feb. 2, 1954

2,667,723

UNITED STATES PATENT OFFICE 2,667,723

METHOD AND APPARATUS FOR PRODUCING WRAPPED ARTICLES

Jacques Edwin Brandenberger, Paris, France, assignor to Societe la Cellophane, Basel, Switzerland, a Swiss company Application November 26, 1952, Serial No. 322,772

Claims priority, application Great Britain September 12, 1952

6 Claims. (Cl. 53—55)

1

In the specification of my Patent No. 2,625,776, there is disclosed a method for the continuous production of wrapped articles, made from pasty or thermoplastic material, more particularly wrapped bars of chocolate and like confectionery, which comprises continuously filling a flexible tube, made from a strip by folding its longitudinal edges round a former, with the material in a plastic state so that the filled tube has a generally flat cross-section, continuously passing the filled tube between smoothing elements which press the flat surfaces of the tube between them to remove surface irregularities and occluded air and to give the flat tube a regular cross-sectional shape, cooling the smoothed tube and cutting the cooled tube into bars. The specification also described an apparatus for producing wrapped bars of chocolate and the like thermoplastic material which comprises means for continuously folding the longitudinal edges of a moving strip around a former to make a flexible tube, means for continuously filling the moving tube with the material in a plastic state so that the filled tube is of a generally flat cross-section, smoothing elements to press continuously on the flat surfaces of the filled tube whereby surface irregularities and occluded air are removed and the flat tube is given a regular cross-sectional shape, means for cooling the smoothed tube and means for cutting the cooled tube into bars.

According to a particular feature of the said invention the tube filled with material in a plastic condition is delivered to means for pressing the flat surfaces of the tube together to form a closure strip across the tube and there is a tube-cutting means for severing the closure strip to divide the tube into individual bars. Particularly in the case of chocolate and like confectionery it is desirable that the severed closure strip be effectively sealed and it has been found in practice that this was not achieved in the known procedure detailed above with that degree of perfection which we consider is required.

This invention has for its main object to ensure the effective sealing of the severed edges of the closure strip. More specifically this invention has for its object to form a sealing band, strip or film along the edges of the closure strips as the individual bars are produced.

A further object is to form such a sealing band or the like in a simple and rapid manner so that the production rate of the individual bars is not impaired.

According to this invention there is applied to

2 the severed edge of such closure strip, as the bars are being advanced, a sealing substance to form, along such entire edge, a sealing band, strip, film or the like. By the term sealing substance as used hereinafter is to be understood a substance having the following characteristics:

(a) It is, prior to use, either a liquid or a solid which is readily melted, (b) It is rapidly convertible from the liquid or molten state to the solid state by cooling when molten (thus, a wax) or by evaporation of a solvent (thus, a nitro-cellulose lacquer) and heat may assist such evaporation in suitable circumstances, (c) When solid it is impermeable, non-tacky and inert, and (d) The conversion to the solid state proceeds sufficiently rapidly for the wrapping process described in the specification of Patent No. 2,625,776 to proceed continuously. Finally, when the chocolate is the material to be wrapped (and in certain other appropriate cases also) it is essential that the substance be not malodorous, and it is preferably odourless and non-toxic.

This invention is also concerned with the apparatus for performing the sealing method set forth above.

For a fuller understanding of the invention a practical application thereof will now be described, by way of example only, with reference to the accompanying drawings whereof:

Fig. 1 is a diagrammatic side view of a complete apparatus for wrapping bars of chocolate in accordance with this invention, Figs. 2 and 3 are diagrammatic views illustrating a conveyor forming part of the apparatus of Fig. 1, Figs. 4 and 5 show the conveyor of Figs. 2 and 3 in greater constructional detail, Fig. 6 is a transverse section on the line VI—VI of Fig. 5, Figs. 7, 8 and 9 illustrate the sealing mechanism which forms part of the apparatus of Fig. 1 and Fig. 10 diagrammatically illustrates the drives to the several mechanisms.

A tube is continuously made from a strip and thereafter filled with chocolate in a plastic state as described in the specification of Patent No. 2,625,776 and the filled tube is continuously delivered to the apparatus shown in Fig. 1. Referring thereto: the apparatus comprises a frame 30 which supports pairs of drums 31, 32 over which passes endless steel bands 33, the adjacent or inner stretches of which run together lengthwise of the frame and parallel, the filled tube being delivered to the drum 31 to between the inner stretches of the bands to be pressed therebetween. The inner stretches pass through a tunnel 34 through which is circulated cooling air from a fan 35, the air moving in a closed circuit and being returned to the fan through a cooler 36 of any known or convenient construction e. g. of tubular form through which there is circulated a cooling liquid in heat exchange relationship with the air.

The cooled, filled tube is passed to a pressing and indenting mechanism 37 and a smoothing mechanism 38 all housed in an insulated chamber 39 to which is delivered cooling air, from fan 35, by duct 40, the air being returned to the fan 35 by duct 41. The function and general construction of the mechanisms 37, 38 is as described in the specification of Patent No. 2,625,776 and reference to said specification will make clear that the tube leaves the mechanism 37, 38 formed with closure strips which divide the tube into individual bars—the latter being connected together by said strips. The divided tube is passed on a conveyor band 42 to the cutting and sealing mechanisms 43 and 44 respectively. The smoothing mechanism 38 may be constructed as disclosed in the specification of Patent No. 2,625,776 although it is preferred that it be made in accordance with my copending United States application Serial No. 322,771. Similarly, the cutting mechanism 43 is preferable in accordance with my co-pending United States application Serial No. 322,773.

The tube comprising a plurality of separate bars connected together by the closure strips is passed from the smoothing mechanism 38 to the endless conveyor band 42 which takes it to the cutting mechanism 43, where each transverse closure strip is severed as the tube is continuously fed forward. The separate bars are carried away from the cutting mechanism by conveyor 111, and it is to be understood that the severed closure strips proceed in line one behind the other. The separate bars are now to be treated to seal the edges of the closure strips and in order to perform the sealing operation in accordance with this invention it is necessary that each individual bar be turned so that both severed edges of the closure strips of each bar be advanced parallel with the line of travel of the bars and to this end the mechanism shown in Figs. 2, 3 and 4 is provided. The individual bars on conveyor 111 are indicated by the reference a and the closure strips at b, the line of travel of the bars being represented by the arrow C. The conveyor 111 delivers bars a against an abutment 123, having a horizontal slot (not shown) to receive the closure strips so that they are not damaged or crumpled, and on to a horizontal table 124 above which rotates a plurality of chordwise blades 125 carried by a hub 126 which is suitably driven. The blades 125 are so disposed and are driven in synchronism with the conveyor 111 so that a bar a passes between each pair of adjacent blades 125 and is carried around thereby for a quarter circle to a conveyor 127 which extends parallel with conveyor 111 and conveys the bars in the same direction as conveyor 111 (as indicated at d). To prevent outward movement of the bars a as they are carried round by the rotary blades there is provided a curved guide member 128. The bars a are slid over the surface of table 124 by blades 125 and fall therefrom on to plate 128 extending the length of the conveyor 127 and lying beneath the table by at least the thickness of the bars a. Conveyor 127 comprises two endless chains 129 supported on sprocket wheels 130 carried by frame 131, the chains having a plurality of spaced, outwardly-projecting fingers 132 which are carried along slots 133, the tips of the fingers then being slightly above the plate 128 to engage the bars a and carry them along.

To maintain the fingers 132 in engagement with the bars a on plate 128 the chains carry rollers 135 (Fig. 6) which ride on rails 136 and support the chains against sag. The chains pass over idler sprocket wheel 137 and are driven by sprocket wheel 138 as later described. Guides 139 (Fig. 4) ensure that the bars a are brought into line on the conveyor 127 before proceeding to the sealing mechanism. The re-arrangement of the bars a by the rotary blades 125 is clearly to be seen in Fig. 3.

While the bars are being carried along by the conveyor 127 they pass through the sealing mechanism which is generally indicated by the reference numeral 140 (Figs. 2, 3, 4 and 5). The constructional details of the sealing mechanism are shown in Figs. 7, 8 and 9 to which reference will now be made. The conveyor 127 is shown in Fig. 7 as passing between a pair of rollers 145 each having a peripheral groove 146, the roller being in the horizontal plane. Each roller 145 is supported above a reservoir 147 containing a wax which is kept molten by electrical or other heating elements 148 which may be thermostatically or otherwise controlled. A disc 149 dips into the molten wax and engages the edge of the roller 145 so that the wax is transferred from the reservoir 147 to groove 146 and carried round therewith.

The roller 145 is on a vertical spindle 150 carrying at its lower end a helical gear 151 which meshes with gear 152 carried by a cross shaft 153 (Fig. 8) the latter being driven as later described. The disc 149 is carried by a stub shaft 154 which carries a gear wheel driven through a train of gears 155, from a pinion 156 mounted on cross shaft 153 (Fig. 9).

Excess wax is removed from the rollers 145 by scrapers 157 (Fig. 8) and the mechanism as a whole is enclosed in a casing generally indicated at 158.

As the bars a are carried along by conveyor 127 the edges of the closure strips are passed through the peripheral grooves 146 and become coated with the molten wax. There is thus formed across the entire edge of each closure strip an impermeable band of wax which effectively seals the wrapped bar. As the bars a are carried away from mechanism 140 the wax sets and the bars may be handled without delay and without interrupting the continuous production of wrapped bars.

It is an essential requirement that the several mechanisms be driven in synchronism and that means be provided to synchronize the mechanisms. The drive to the mechanisms which enable this to be done is shown diagrammatically in Fig. 10.

An electric motor 160 is drivingly coupled to a main shaft 161 by belts 162 and the drives to the several mechanisms are taken off shaft 161. Thus, the drums 32 (Fig. 1) are drivingly coupled together through gear wheels 163 (Fig. 10) and are driven through helical gearing 164 from shaft 161. The helical gearing 164 is driven from an infinitely variable speed gear box assembly 165 driven by shaft 161. The driving speed of the gear box is adjusted by handwheels 166 so that the mechanism comprising drums 32 may be brought into synchronism with the other mechanisms. The pressing and indenting mechanism 37 is driven from shaft 161 through helical gearing 167. The smoothing mechanism 38 is driven from shaft 161 through helical gearing 169. The cutter mechanism 43 is also driven from shaft 161 through helical gearing 170 and a variable speed gear adjustable by handwheel 171. The rotary blades 125 are driven through helical gears 172 from an infinitely variable speed gear box 173 which is driven from shaft 161 and the output speed of which is varied by handwheel 174. Similarly the conveyor 127 is driven from shaft 161 through infinitely variable speed gear box 175 adjustable by handwheels 176, the cross shaft 153 being driven by said gear box.

The provision of helical gears ensures that backlash is reduced to a minimum so that the drive to the several mechanisms ensures synchronism.

I claim:

1. An apparatus for the continuous production of wrapped articles, made from a pasty material, comprising means for pressing together the opposite surfaces of a flexible tube which has been filled with the pasty material to form a closure strip across the tube, means for severing the closure strip to divide the tube into individual bars, means for carrying the individual, wrapped bars along in a substantially horizontal plane and means for applying to the severed edges of each closure strip, as the bars are carried along, a sealing substance, said closure-sealing means comprising, for each closure strip, a driven roller rotating in said plane, each roller having a peripheral groove to hold the sealing substance and means to supply said substance to the peripheral groove which is carried around in the groove to the closure strip for application thereto to form, along each entire edge thereof, a sealing band.

2. Apparatus as claimed in claim 1 wherein the means for carrying the individual bars in a substantially horizontal plane comprises a rotating blade that receives the bars from a first conveyor upon which the bars rest with the severed edges of the closure strips of adjacent bars normal to the direction of travel of the bars, said blade carrying each bar in a horizontal plane through an arc of a circle whereby the severed edges are brought parallel to the direction of travel of the bars and are so delivered to a second horizontal conveyor.

3. Apparatus as claimed in claim 2 in which the rotating blade carries the bars through a quarter circle and the second conveyor travels parallel with and in the same direction as the first conveyor.

4. Apparatus as claimed in claim 3 in which the bars are presented successively to a rotating wheel having a plurality of chordwise blades, the bars being received one each, between each pair of adjacent blades.

5. Apparatus as claimed in claim 4 in which a guide member is provided to prevent outward radial movement of the bars as they are carried round from the first to the second conveyors.

6. Apparatus as claimed in claim 1 in which the substance is normally solid and is maintained molten in a receptacle above which is mounted said rollers and said substance supply means is a disc which dips into the molten substance, the peripheries of said rollers engaging said disc so that the molten substance is transferred to the grooved rollers.

JACQUES EDWIN BRANDENBERGER.

References Cited in the file of this patent

UNITED STATES PATENTS

| Number | Name | Date |
|---|---|---|
| 1,400,572 | Smith | Dec. 20, 1921 |
| 2,334,029 | Ranney | Nov. 9, 1943 |
| 2,625,776 | Brandenberger | Jan. 20, 1953 |